Nov. 24, 1970 E. J. VITEK 3,543,081

LOW POWER ELECTROSTATIC DEFLECTION SYSTEM

Filed Feb. 10, 1969 2 Sheets-Sheet 1

INVENTOR
EDMUND J. VITEK

BY Ernest P. Klipfel

ATTORNEY

Nov. 24, 1970 E. J. VITEK 3,543,081

LOW POWER ELECTROSTATIC DEFLECTION SYSTEM

Filed Feb. 10, 1969 2 Sheets-Sheet 2

INVENTOR
EDMUND J. VITEK

BY Ernest P. Klipfel

ATTORNEY

United States Patent Office 3,543,081
Patented Nov. 24, 1970

3,543,081
LOW POWER ELECTROSTATIC DEFLECTION SYSTEM

Edmund J. Vitek, Glen Burnie, Md., assignor to Westinghouse Electric Corporation, Pittsburgh, Pa., a corporation of Pennsylvania Filed Feb. 10, 1969, Ser. No. 798,008
Int. Cl. H01j 29/74
U.S. Cl. 315—29 11 Claims

ABSTRACT OF THE DISCLOSURE

An electrostatic deflection system for a cathode ray tube employs a sweep generator having a constant current charging circuit which includes as a charging capacitor, the capacity of the electrostatic deflection plates of the cathode ray tube and the stray capacity of the circuit. The constant current charging circuit includes means for adjusting the rate of charging to develop a dynamic deflection field between the deflection plates for deflecting the scanning beam through a scan sweep at a predetermined rate. A swtich circuit triggered by the synchronizing pulses discharges the capacitor to provide the return sweep of the scanning beam.

BACKGROUND OF THE INVENTION

Field of the invention

Deflection of the scanning electron beam in a cathode ray tube is typically effected through the use of either electrostatic deflection or magnetic deflection systems. For many applications, magnetic deflection systems have been employed since the power requirements for such systems are much lower than those for electrostatic deflection systems.

Electrostatic systems, however, are of much simpler construction and afford a reduction in cost, size, and weight as compared to magnetic systems. An electrostatic deflection system in which the power requirements are substantially reduced from those required in prior art systems is therefore desirable for use in many applications of cathode ray tubes.

SUMMARY OF THE INVENTION

The electrostatic deflection system of the invention includes a solid state sweep circuit which can operate an electrostatically deflected cathode ray tube requiring substantial deflection voltages, while requiring relatively low level power in its operation. The sweep circuit comprises a constant current charging circuit and a switching circuit. The capacitive elements of the charging circuit include the capacity of the deflection plates and the stray capacity of the circuit. The constant current charging circuit includes a variable control element for controlling the magnitude of the charging current and thus the rate of charging of the capacitance of the deflection plates. A dynamic electrostatic deflection field or deflection voltage, increasing with time, is thereby developed between the deflection plates. The field increases with time and deflects the scanning electron beam through a scan sweep across the display screen of the tube. The switching circuit is triggered by each incoming sync pulse to rapidly discharge the capacitors of the charging circuit. The deflection field rapidly decays, and causes the scanning beam to be rapidly deflected through a return sweep.

In the preferred embodiment of the invention, the system is of symmetrical configuration, the symmetrical portions being connected to power supply sources of equal amplitude but opposite polarity voltages. This configuration permits the development of a large deflection voltage while subjecting the individual portions to lower voltage operating conditions. A dynamic feedback circuit automatically compensates for non-linearities in the operating characteristics of the sweep circuit.

The disclosed system may be utilized for both the horizontal and the vertical deflection systems of a cathode ray tube.

DETAILED DESCRIPTION OF THE INVENTION

Figures 1, 2:
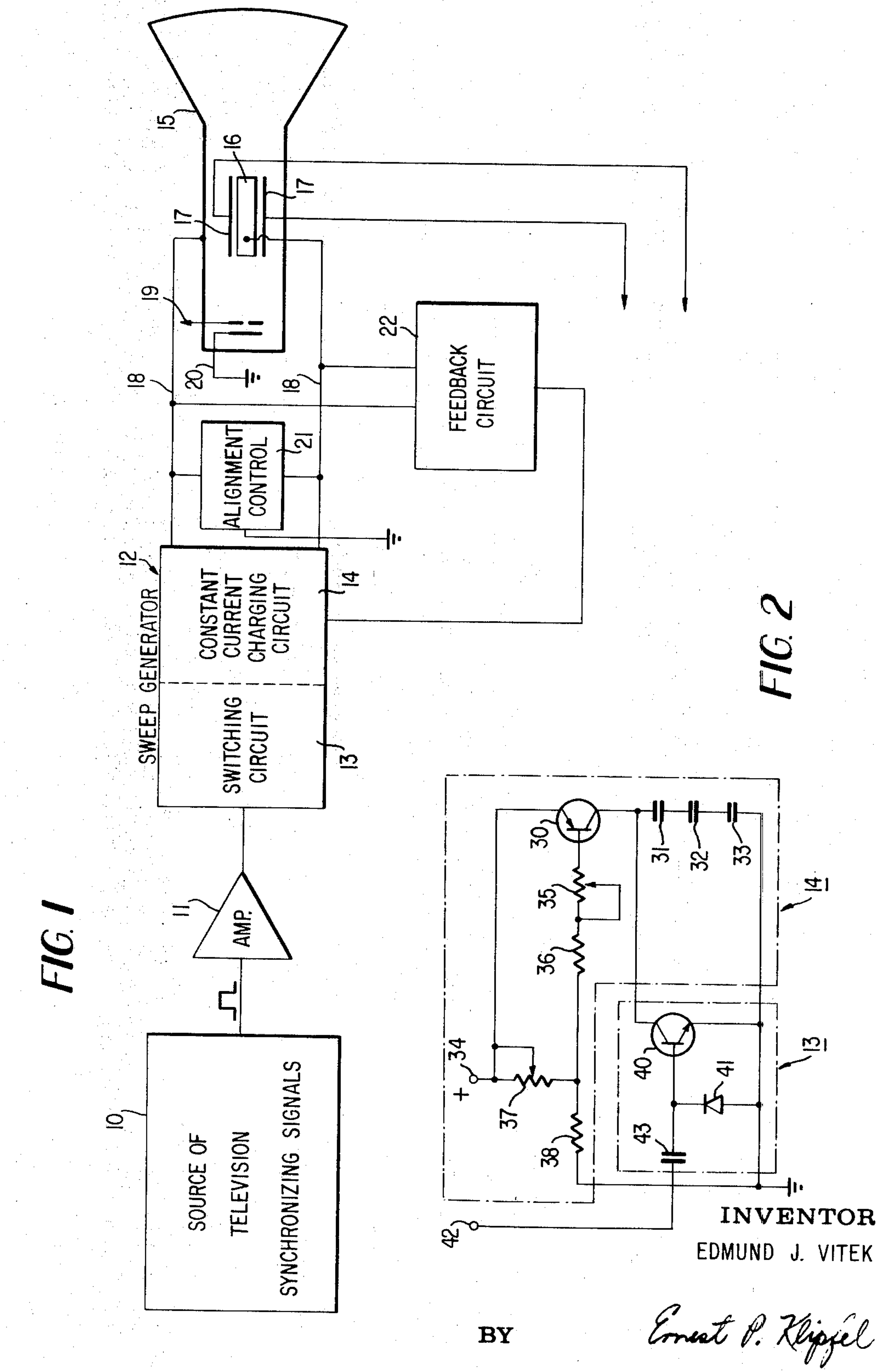
FIG. 1 is a block diagram of a cathode ray tube system employing an electrostatic deflection system in accordance with the invention.
FIG. 2 is a schematic of the basic sweep generator of the electrostatic deflection system of the invention.

In FIG. 1 is shown a block diagram of a cathode ray tube system incorporating an electrostatic deflection system in accordance with the invention. The source of television synchronizing (sync) signals 10 may comprise a sync source, as employed at a transmitter, or the sync separator of a television receiver. The output from the source 10 is applied through a connecting lead to an amplifier 11. The waveform illustrated adjacent the connecting lead represents a separated sync pulse. The separated and amplified sync pulses are applied to a sweep generator 12 which includes a switching circuit 13 and a constant current charging circuit 14.

The cathode ray tube 15 includes a pair of horizontal deflection plates 16 and a pair of vertical deflection plates 17. The output of the sweep generator 12 is applied through leads 18 to the horizontal deflection plates 16. As described in detail hereafter, the capacitance of the horizontal deflection plates 16 and the stray capacitance of the circuit are employed as a portion of the charging capacitor of the constant current charging circuit 14 of sweep generator 12. A beam intensity control signal may be supplied to the gun of the cathode ray tube 15, schematically illustrated by the grid 19 and cathode 20. The signal may comprise the blanking signal in a camera tube or the video signal in a television receiver.

An alignment control circuit 21 of conventional type is connected to the leads 18 to provide proper beam positioning and alignment in the cathode ray tube 15. A feedback circuit 22 may also be connected to the leads 18, which circuit responds to the deflection voltage generated by the sweep generator 12 for automatically supplying a feedback control voltage to the charging circuit 14 of the sweep generator 12. This control voltage may be provided to assure linearity in the deflection of the electron beam resultant from the deflection voltage.

The electrostatic deflection system of the invention may also be employed for effecting vertical deflection of the scanning beam in a cathode ray tube. The vertical deflection plates 17 of cathode ray tube 15 are therefore shown connected to leads which may receive deflection signals from a sweep generator substantially identical to that shown in FIG. 1 for the generation of horizontal deflection signals.

In FIG. 2 is shown a simplified schematic of the sweep generator 12 of FIG. 1 with the switching circuit 13 and the charging circuit 14 separately enclosed and identified with the same numerals as in FIG. 1. The constant current charging circuit includes an adjustable current control element shown as a PNP transistor 30, the emitter-collector path of which is connected in a series circuit including a coupling capacitor 31, a load capacitor 32 representing the capacitance of the deflection plates of the cathode ray tube, and a decoupling capacitor 33. The elements 30 through 33 are connected in series between a positive power supply terminal 34 and ground.

The base terminal of transistor 30 is connected through the series connected variable resistor 35 and resistor 36 to the series junction of a variable resistor 37 and a resistor 38. The resistors 37 and 38 are connected between the positive power supply terminal and ground. Variable resistor 35 is provided in conventional fashion as a bias control. Variable resistor 37 is adjusted to control the level of conduction of transistor 30 and thus the amplitude of the charging current which flows in the charging circuit 14.

Assuming that variable resistor 35 is adjusted to cause transistor 30 to operate in its linear range, the amplitude of the charging current may be selected by adjustment of variable resistor 37. The load capacitor 32 is therefore charged at a rate, and the electrostatic deflection field is increased at a rate, corresponding to that required for linear deflection of the scanning beam across the screen of the cathode ray tube in the proper time interval.

The switching circuit 13 includes a high voltage transistor 40 connected at its collector terminal to the junction of the collector terminal of transistor 30 and coupling capacitor 31, and at its emitter terminal to ground. The base terminal of transistor 40 is connected through a reverse poled diode 41 to the emitter terminal of transistor 40 and thus to ground. Diode 41 normally clamps the base terminal of transistor 40 to the same potential as the emitter terminal, preventing conduction of transistor 40. Positive going sync pulses applied to the input terminal 42 are coupled through capacitor 43 to the base of transistor 40. The positive going sync pulses reverse bias the diode 41 and cause the transistor 40 to conduct.

During each sync pulse, and thus during conduction of transistor 40, the capacitors 31, 32, and 33 of the charging circuit are effectively short circuited through the collector-emitter path of transistor 40 to ground. The charge developed in load capacitor 32 is thereby rapidly dissipated, resulting in a correspondingly rapid decrease in the deflection voltage amplitude whereby the beam is deflected through a return sweep. At the termination of the sync pulse, the transistor terminates conduction. The diode 41 is no longer back-biased, and clamps the base terminal of the transistor 40 to the potential of the emitter terminal, assuring rapid and complete turn-off of the transistor 40. The charging circuit thereupon resumes its charging function for producing the succeeding beam sweep.

Figure 3:
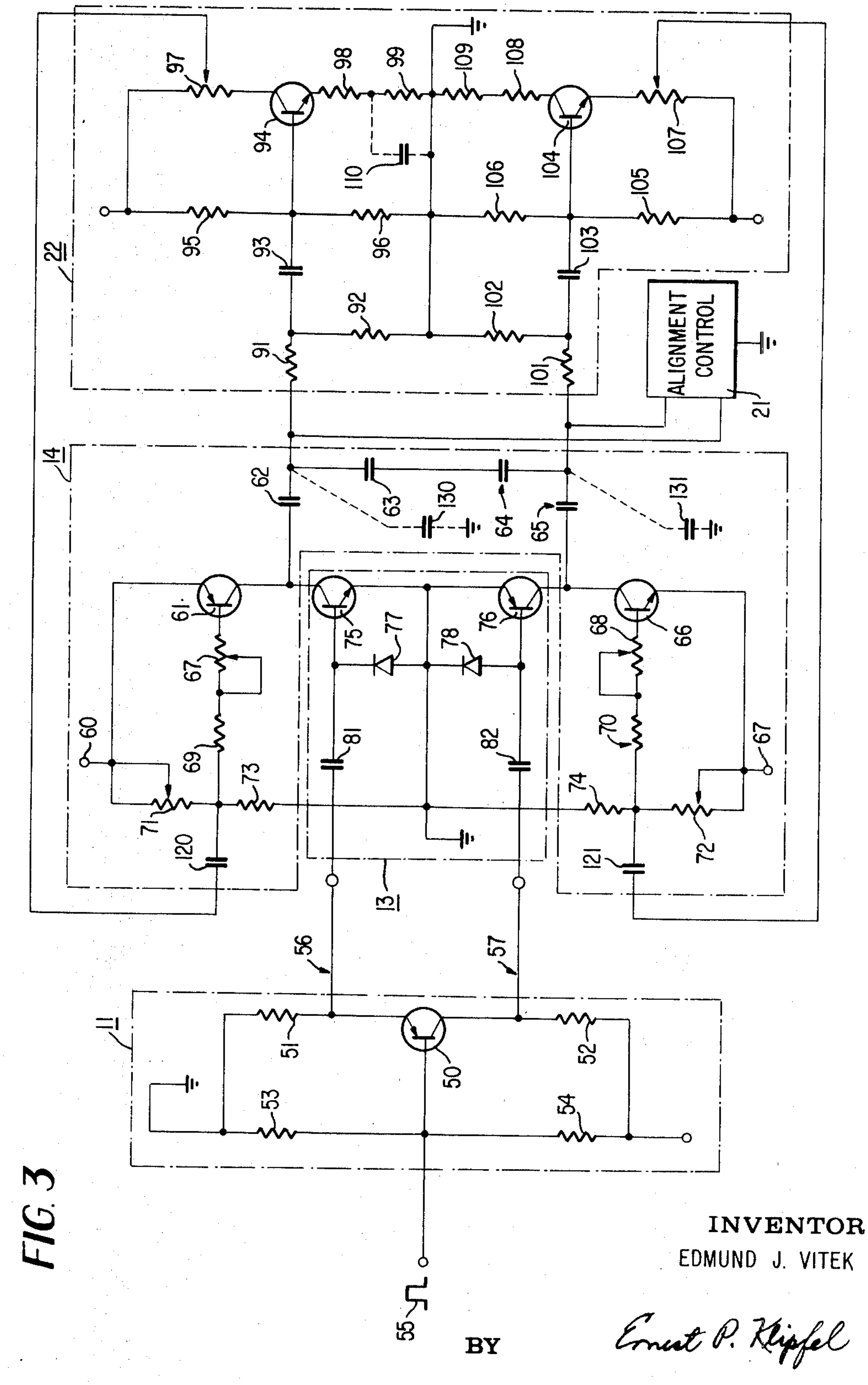
FIG. 3 is a schematic of a preferred embodiment of the invention, the schematic being shown in portions generally corresponding to the portions of the block diagram of FIG. 1.

In FIG. 3 is shown a circuit schematic of the preferred embodiment of the electrostatic deflection system of the invention. The portions of the circuit are labelled and numbered as in the block diagram of FIG. 1.

Amplifier 11 includes a PNP transistor connected at its emitter terminal through a first load resistor 51 to ground and at its collector terminal through a second load resistor 52 to a negative power supply terminal. The base terminal of transistor 50 is connected to the series junction of resistors 53 and 54 connected between ground and the negative power supply terminal.

Resistors 53 and 54 apply a bias to the base terminal of transistor 50 to maintain the latter conducting. The resistors 51 and 52 are of approximately the same value and the collector-emitter path of transistor 50, when conducting, is of very low resistance value. The collector and emitter terminals of transistor 50 and thus the output lines 56 and 57 are at approximately the same voltage which is one-half of the voltage between the negative power supply terminal and ground.

The application of a positive going sync pulse, shown at 55, to the input terminal of amplifier 11 and thus to the base terminal of transistor 50 terminates conduction of the transistor 50. As a result, a positive going pulse is produced on the output lead 56 and a negative going pulse is produced on the output lead 57. These pulses are applied to the input terminals of the sweep generator 12.

The sweep generator 12 includes a constant current charging circuit 14 and a switching circuit 13. The charge path of the constant current charging circuit includes the positive power supplya terminal 60, the emitter-collector conducting path of transistor 61, the coupling capacitor 62, the series connected capacitors 63 and 64, coupling capacitor 65, the collector-emitter conducting path of transistor 66, and the negative power supply terminal 67. The positive and negative power supply terminals 60 and 67 are connected to sources of equal but opposite DC voltage.

For convenience of presentation, capacitors 63 and 64 are indicated as dummy loads and represent the capacitance of the deflecting plates, for example, the horizontal deflecting plates, of a cathode ray tube such as the plates 16 of the cathode ray tube 15 in FIG. 1.

The PNP transistor 61 and the NPN transistor 66 are employed as adjustable current control elements for controlling the amplitude of the charging current and thus for controlling the rate of charge of the capacitors 62 through 65. In this manner, the rate at which an electrostatic deflection voltage or field is developed across the load capacitors 63 and 64, corresponding to the capacitance of the deflection plates, is controlled in accordance with the deflection requirements of the cathode ray tube.

The symmetrical arrangement of transistors 61 and 66 and the associated capacitors between the positive and negative power supply terminals is better understood with reference to the effect of the deflecting of an electron beam in a cathode ray tube. When no deflection voltage is supplied to the deflecting plates, for a given plane of deflection, the beam passes essentially through the deflection region defined by the deflecting plates in a path parallel to the plates and impinges upon the midpoint of the screen. When a potential difference of a given polarity is established between the plates, the electron beam is deflected from the parallel path through an arc approaching the more positive plate and, for a sufficiently large potential difference, causes the beam to impinge upon one extreme of the screen. Similarly, development of an opposite polarity potential difference will cause the beam to be deflected toward the opposite extreme edge of the screen.

Since a relatively large voltage often is required to effect the beam deflection between these extreme positions, the circuit of the invention employs a charging circuit having symmetrical portions which operate between equal amplitude but opposite polarity supplies of DC voltage and ground. The charging operation effectively comprises the generation by the symmetrical portions of the charging circuits of corresponding sawtooth voltages of equal amplitude but of opposite polarity. These sawtooth voltages are decoupled from the corresponding DC power supplies by the coupling capacitors 62 and 65. The alignment control 21 provides a DC reference for these AC sawtooth voltages. Thus, each sawtooth voltage may be viewed as being applied to a corresponding capacitor, shown as the dummy load capacitors 63 and 64, connected between the associated coupling capacitors and effectively ground potential.

To control the rate of charging, and thus the amplitude of the charging current, there are provided in the base circuits of the transistors 61 and 66, variable potentiometers 67 and 68 connected in series with resistors 69 and 70, respectively. The resistors 69 and 70 are respectively connected to the junction of the series connected potentiometer 71 and resistor 73, and potentiometer 72 and resistor 74. These series circuits are connected as potential divider networks between the power supply terminal 60 and ground, and the power supply terminal 67 and ground, respectively. The potentiometers 71 and 72 are conventional bias control elements and are adjusted to assure that the respectively associated transistors 61 and 66 operate in a linear conduction range in the charging operation.

The switching circuit includes symmetrically disposed transistors 75 and 76 of opposite conductivity type connected at their emitter terminals to ground and at their corresponding collector terminals to the collector terminals of transistors 61 and 66, respectively. The base and emitter terminals of transistors 75 and 76 are interconnected by diodes 77 and 78. The base terminals of transistors 75 and 76 are further connected through capacitors 81 and 82, respectively, to the input terminals of the switching circuit 13.

In operation, the positive sync pulse on output leads 56 and the negative sync pulse on output lead 57 of amplifier 11 are coupled by capacitors 81 and 82, respectively, to the base terminals of the normal nonconducting transistors 75 and 76 to render the latter conductive. When conducting, transistors 75 and 76 effectively short circuit the series loop of the capacitors 62 through 65 of the charging circuit, causing a rapid discharge of the capacitors. As discussed previously, the rapid discharge causes the deflection field between the deflection plates to correspondingly decay in a rapid manner for deflecting the beam back to its initial deflection position. Upon termination of the sync pulse, the transistors 75 and 76 terminate conduction. Diodes 77 and 78 are poled for conduction in the nonconductive state of transistors 75 and 76, effectively short circuiting the emitter-base junctions of these transistors. This assures that the switching transistors remain in the nonconductive state in the absence of sync pulses. The charging of capacitors 62 through 65 thereupon resumes, under control of the transistors 61 and 66.

In some applications, it is desirable to provide a feedback circuit 22 to provide dynamic correction for nonlinearities in the current conduction characteristics of the transistors 61 and 66 of the charging circuit. The deflection voltage at the junction of capacitors 62 and 63 is applied to the series connected resistors 91 and 92, the latter being connected to ground. The resistors 91 and 92 form a voltage divider network, the series junction of which is connected through capacitor 93 to the base terminal of transistor 94. Resistor 91 is preferably of large value to effect isolation of the charging circuit.

The base terminal of transistor 94 is connected to the series junction of biasing resistors 95 and 96 which in turn are connected between positive power supply terminal and ground in a conventional biasing configuration. The collector terminal of transistor 94 is connected through a load resistor 97 to the positive power supply terminal, and the emitter terminal is connected through series resistors 98 and 99 to ground.

The feedback circuit 22 further includes a symmetrical circuit corresponding to that of the transistor 94. Thus, the voltage at the series junction of capacitors 64 and 65 of the charging circuit is applied to the voltage divider resistors 101 and 102 and through coupling capacitor 103 to the base terminal of transistor 104. Voltage divider resistors 105 and 106 develop a voltage at their series junction which is applied as a bias voltage to the base of transistor 104. The emitter terminal of transistor 104 is connected through potentiometer 107 to a negative power supply terminal and the collector terminal thereof is connected through resistors 108 and 109 to ground. To insure symmetrical operation of the two portions of the feedback circuit 22, a bypass capacitor 110 may be provided as indicated to increase the gain of transistor 94.

The amount of feedback voltage supplied by the feedback circuit 22 to the charging circuit 14 is selected by adjustment of the tap positions of potentiometers 97 and 107. Since the feedback circuit 22 may be initially adjusted for symmetrical operation, the taps of potentiometers 97 and 107 may be ganged for common actuation. The feedback voltages thus derived are coupled through capacitors 120 and 121 to the base circuits of transistors 61 and 66, respectively, and, as shown, provide negative feedback.

As noted previously, the deflection system of the invention is applicable for effecting either horizontal or vertical deflection of a scanning beam. Horizontal scanning occurs at a much higher rate than vertical scanning. Correspondingly, the horizontal sync pulses occur at a much higher rate than the vertical sync pulses. Since the effective capacitance of the vertical deflection plates is approximately equal to that of the horizontal deflection plates, it is necessary to provide a large capacitance value in the charging circuit when the latter is employed in a vertical deflection system. Such increase in capacitance may be effected by the connection of capacitors 130 and 131 between the series junctions of capacitors 62 and 63, and capacitors 64 and 65, respectively, and ground. In addition, the value of the capacitors 62 and 65 may be increased for this same purpose. The values of the capacitors 120 and 121 in the feedback circuit may likewise be increased.

I claim as my invention:

1. For use with a cathode ray tube having electrostatic deflection plates requiring substantial deflection voltages and between which an electrostatic field is developed for deflecting the scanning beam of the cathode ray tube through successive scan and return sweeps at a rate determined by successive sync pulses, a low power electrostatic deflection system comprising:
   - a constant current charging circuit having charging capacitance means including the capacitance of the electrostatic deflection plates of the cathode ray tube, said charging circuit conducting all of the charging current to the deflection plates to charge the capacitance of the electrostatic deflection plates to develop a dynamic deflection field for deflecting the scanning beam through a scan sweep, and
   - switching means responsive to sync pulses for discharging the charging capacitance means of said charge circuit during each sync pulse to reduce the electrostatic deflection field for deflecting the scanning beam through a return sweep.

2. An electrostatic deflection system as recited in claim 1 wherein said charging circuit includes:
   - current control means connected in a series conducting path with said charging capacitance means, and connected directly to said charging capacitance means by means of a coupling capacitor, and
   - means for adjusting the level of current conducted by said current control means to control the rate of charging of said deflection plate capacitance for effecting deflection of the beam through the scan sweep at a predetermined rate.

3. An electrostatic deflection system as recited in claim 2 wherein said current control means comprises a transistor means and said adjusting means comprises adjustable bias means for statically adjusting the level of current conducted by said transistor means.

4. An electrostatic deflection system as recited in claim 3 wherein there is further provided:
   - feedback means responsive to the charging of said deflection plate capacitance to generate a feedback control signal, and
   - means coupling said feedback control signal to said transistor means of said charging circuit to dynamically adjust the level of current conducted by said transistor means through the scan sweep.

5. An electrostatic deflection system as recited in claim 2 wherein said charging circuit includes:
   - first and second terminals adapted for connection to power supplies of opposite polarity, and
   - said current control means includes first and second current control means connected in series with said deflection plate capacitance between said first and second terminals, respectively, for charging said deflection plate capacitance.

6. An electrostatic deflection system as recited in claim 5 wherein said power supplies are of equal potential.

7. An electrostatic deflection system as recited in claim 5 wherein:

said switching means comprises first switching means connected between the charging circuit intermediate said first current control means and said deflection plate capacitance and a ground potential terminal and a second switchng means connected between the charging circuit intermediate said second current control means and said deflection plate capacitance and said ground potential terminal, and means for maintaining said first and second switching means nonconductive intermediate successive sync pulses and for rendering said first and second switching means conductive in response to each sync pulse to discharge said charging capacitance of said charging circuit.

8. An electrostatic deflection system as recited in claim 7 wherein:

said first and second switching means comprise transistors of opposite conductivity type, and there is further provided:

amplifier means having an input and having first and second outputs connected to said first and second switching means, said amplifier means being responsive to each sync pulse received at said input to produce opposite polarity pulses at said first and second outputs for simultaneously rendering said first and second switching means, respectively, conductive.

9. An electrostatic deflection system as recited in claim 7 wherein there is further provided a feedback circuit including:

first feedback means connected between said deflection plate capacitance and said first current control means and second feedback means connected between said deflection plate capacitance and said second current control means, said first and second feedback means being responsive to the charging of said deflection plate capacitance to generate feedback control signals, and means coupling said first and second feedback control signals to said first and second current control means, respectively, of said charging circuit to simultaneously and dynamically adjust the level of current conducted by said first and second current control means.

10. An electrostatic deflection system as recited in claim 7 wherein said first and second current control means comprise opposite conductivity type transistors, and said adjusting means comprise first and second bias circuits corresponding to said first and second transistors and connected between the associated power supply terminals and said ground potential terminal for controlling the level of current conducted by the corresponding transistors.

11. An electrostatic deflection system as recited in claim 10 wherein:

said switching means comprise first and second transistors of opposite conductivity type with respect to each other andwith respect to said first and second current control transistors means, respectively.

References Cited

UNITED STATES PATENTS

| | | | | |
|---|---|---|---|---|
| 2,552,884 | 5/1951 | Cannon | ----------- | 315—29 |
| 2,501,857 | 3/1950 | Stewart | ----------- | 315—29 |

RODNEY D. BENNETT, Primary Examiner

J. G. BAXTER, Assistant Examiner